April 22, 1952

C. L. STOCKSTILL 2,594,232

SOLAR HEATER AND HEAT EXCHANGER

Filed Sept. 16, 1947

INVENTOR.
Clinton L. Stockstill
BY Barthel & Bugbee
ATTYS

April 22, 1952     C. L. STOCKSTILL     2,594,232
SOLAR HEATER AND HEAT EXCHANGER
Filed Sept. 16, 1947     2 SHEETS—SHEET 2
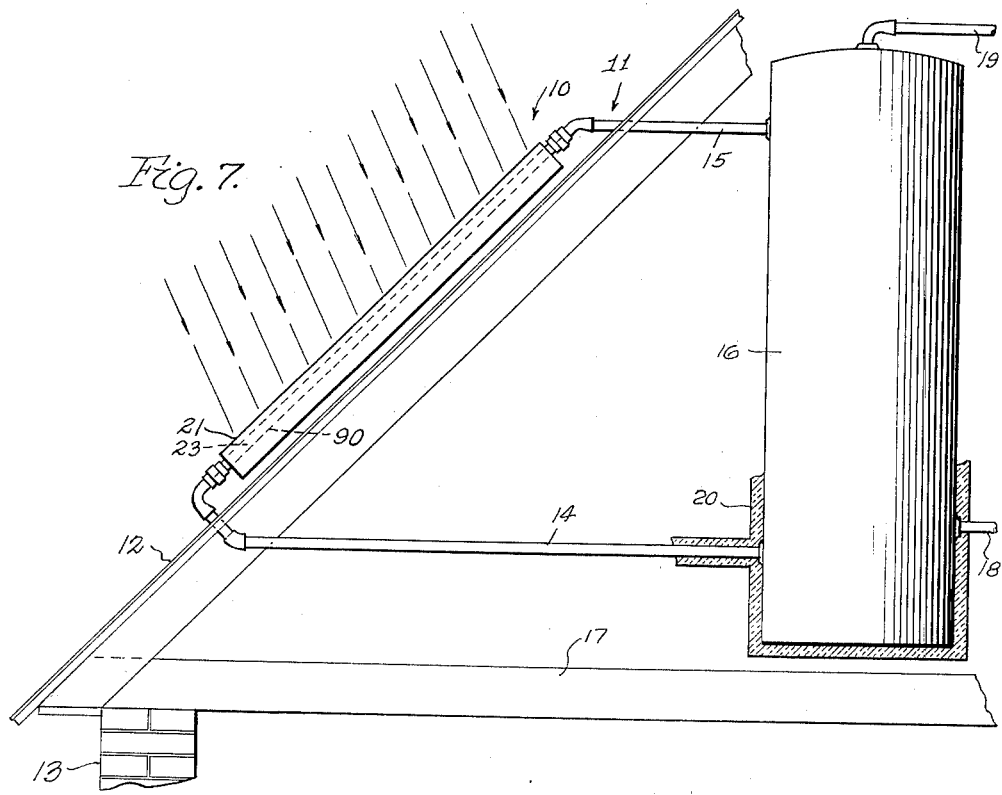
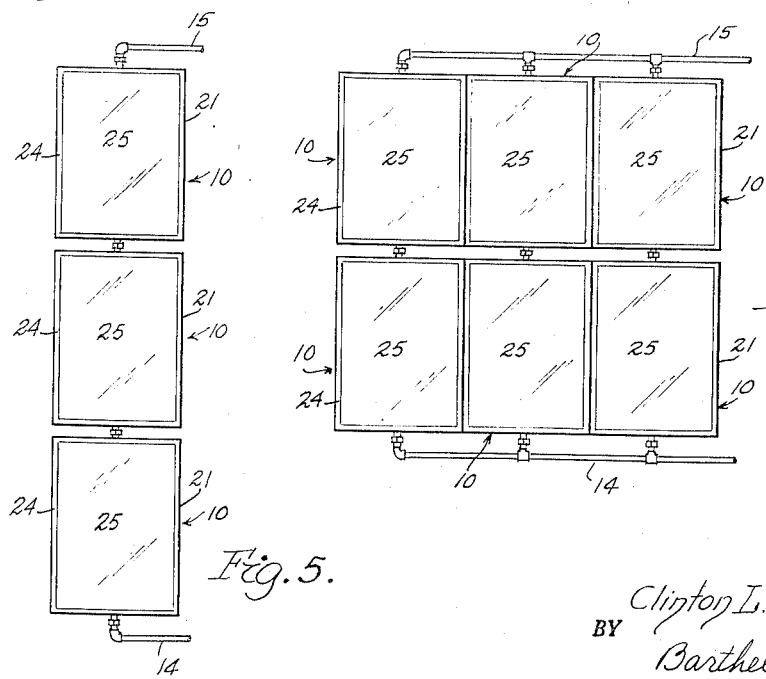
INVENTOR.
Clinton L. Stockstill
BY Barthel + Bugbee
ATTYS Patented Apr. 22, 1952

2,594,232

UNITED STATES PATENT OFFICE 2,594,232

SOLAR HEATER AND HEAT EXCHANGER

Clinton L. Stockstill, Detroit, Mich.

Application September 16, 1947, Serial No. 774,220

4 Claims. (Cl. 257—262.22)

This invention relates to solar heaters, or devices for utilizing the heat of the sun to heat water or other liquids.

One object of this invention is to provide a solar heater which is simply and inexpensively constructed and which employs heat-absorbing elements which are capable of production by stamping or extrusion processes.

Another object is to provide a solar heater formed from extruded metal parts, wherein the heat exchanger includes tubular heat absorbing elements having integral fins thereon and connected at their opposite ends to headers which receive the cool water or other liquid at one end and carry away the heated water from the other end, the headers being also optionally provided with integral fins, these fins increasing the heat-absorbing ability of the heater.

Another object is to provide a solar heater as set forth in the preceding objects, wherein the heat exchanger is formed from an elongated tubular member with fins along its opposite sides, these fins being transversely cut away at intervals so as to enable the tubular member to be bent in a zigzag manner into a sinuous form with the fins arranged edge to edge.

Another object is to provide a solar heater as set forth in the preceding objects, wherein the integral construction of the tubular members and their flanges or fins eliminates the costly and inefficient manufacture of these elements in separate parts, as well as the interference with the conduction of heat through the layers of solder or other dissimilar metals previously used in uniting the various parts.

Figure 5 is a diagrammatic front elevation of three solar heaters of the present invention, connected in series;

Figure 6 is a diagrammatic front elevation of six solar heaters of the present invention, connected in a series-parallel arrangement; and Figure 7 is a diagrammatic side elevation, partly in section, of a solar heater system installed in the upper portion of a building and employing one of the solar heaters of the present invention.

Figure 1:
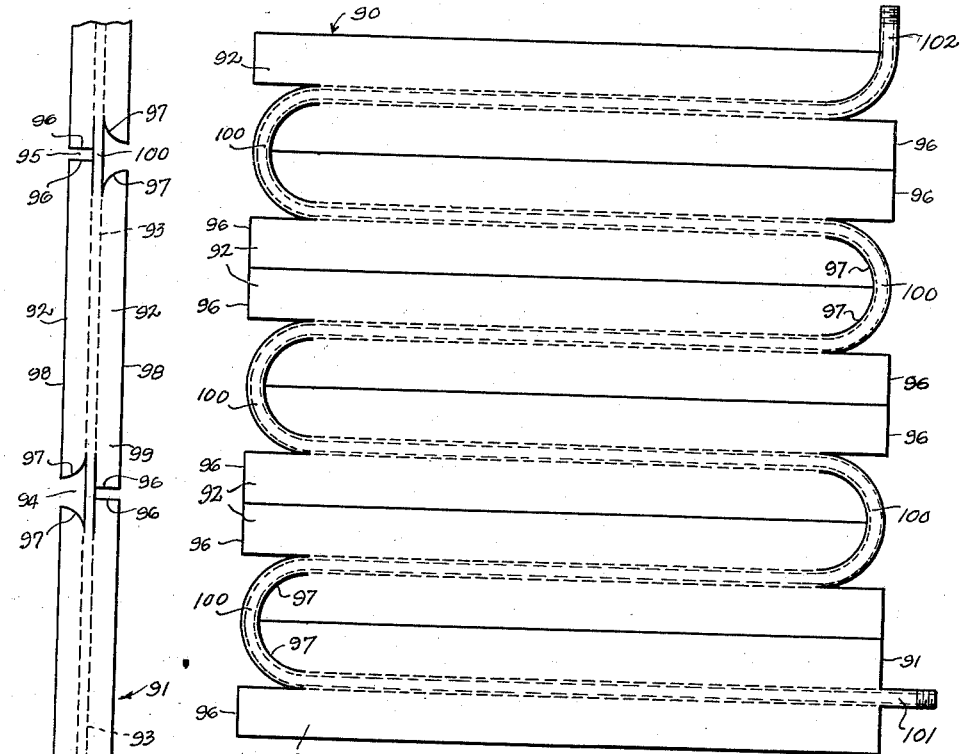
Figure 1 is a front elevation of a heat exchanger unit, wherein the unit is formed from an elongated finned tubular member bent into a sinuous form.

Referring to the drawings in detail, Figures 1 and 7 show a solar heater generally designated 10, according to a preferred form of the invention, as contained in a solar heating system 11 (Figure 7). The solar heater 10 is preferably mounted upon the roof 12 of a building 13 where it will be exposed to the maximum amount of direct sunlight and connected at its lower and upper ends by pipes 14 and 15 to the lower and upper portions of a tank 16 mounted in any suitable location, such as upon the attic floor 17 of the building 13. Connected to the lower portion of the tank 16 is a water inlet pipe 18 and to its upper end is connected a water outlet pipe 19 for conveying the heated water to the location where it is used. The tank 16 is preferably surrounded by an insulation layer 20, which may also be extended around the pipes 14 and 15 to conserve heat.

The solar heating system 11 may contain but a single solar heater 10 or it may include a battery of such heaters 10 as shown in Figures 5 and 6. In Figure 5 the heaters 10 are connected in series between the cool water pipe 14 and the heated water pipe 15. In Figure 6, however, the heaters 10 are connected in a series-parallel arrangement whereby pairs of individual heaters 10 are connected in series and these pairs are in turn connected in parallel between the pipes 14 and 15.

The solar heater 10 consists generally of a box-like glass-covered casing or housing 21 containing a heat exchanger 90. The heat exchanger 90, removed from the housing 21, is shown assembled in Figure 1 and with its parts separated in Figure 2. The casing or housing 21 is a box-like structure having sides 23 (Figure 7) of wood or other suitable material, assembled in a rectangular arrangement. Secured to the front edges of the sides 23 for example by metal bars forming a frame 24 which holds a glass pane or panel 25 positioned to cover the opening between the sides 23, the latter being recessed or grooved to receive the pane 25.

Figure 2:
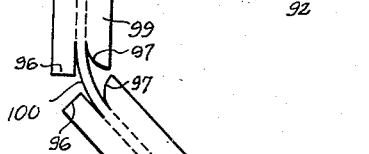
Figure 2 is a front elevation of the elongated finned tubular member from which the heat exchanger unit of Figure 1 is constructed, with the bending operation partially performed.
Figure 3:
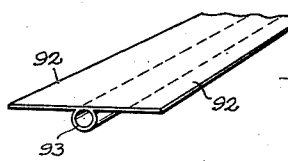
Figure 3 is a perspective view of a portion of the tubular member shown in Figure 1.
Figure 4:
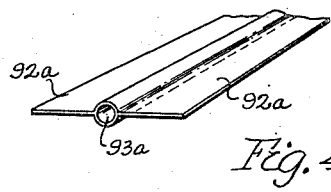
Figure 4 is a perspective view similar to Figure 3 but showing a modification thereof.

The heat exchanger 90 shown in Figures 1 to 3 inclusive is formed by preparing an elongated finned tubular member 91, preferably by extrusion, with aluminum as the preferred material. The fins 92 on opposite sides of the tubular portion 93 are discontinuous, gaps 94 and 95 being cut alternately on either side thereof from one end to the other (Figure 2). The gaps 95 are in the form of rectangular notches having spaced straight edges 96 whereas the gaps 94 are provided with arcuate edges 97 diverging toward the tubular portion 93 from a minimum width of gap at the outer edges 98. Thus the elongated tubular member 91 is provided with spaced heat exchanger tube portions 99 at intervals along its length. The gaps 94 and 95 are preferably formed by punching or stamping but may be formed in any other convenient way. The fins 92 are either formed tangentially (Figure 3) to the tubular portions 93 or diametrically to the tubular portion 93a as at 92a in Figure 4.

When the elongated finned tubular member 91 has been prepared and slotted in the manner shown in Figure 2, it is bent at points adjacent the gaps 94 and 95 and alternately in opposite directions. Figure 2 shows the commencement of the bending operations and Figure 1 the finished heat exchanges. The arcuate edges 97 are formed with radii of curvature substantially equal to the widths of the fins 92 so that when the spaced heat exchanger tube portions 99 are bent edge to edge upon one another (Figure 1) the connecting tubular portions 100 will curve into arcs coinciding with the arcuate edges 97. The latter as a result of the bending operations, unite to form semicircles as shown at the opposite sides of Figure 1.

In this manner the heat exchanger 90 is formed in a single piece with its fins 92 integral with the tubular portions 93 and their connection portions 100. Tubular extensions 101 and 102 at the opposite ends of the elongated member provide inlet and outlet connections for the liquid. The heat exchanger 90 when thus assembled, may be used either by itself or in a suitable housing, such as the housing 21 of Figures 5 to 7 inclusive.

The solar heaters 10, employing the heat exchanger 90, may be mounted in units which are conveniently shipped and carried up to their positions on the roof. Typical arrangements of such units are shown in Figures 5 and 6 as previously described. A typical circuit is shown in Figure 7 also previously described.

The operation of the invention will be understood from Figure 7. Water is supplied to the tank 16 such as through the pipe 18. As the tank 16 is filled, the water likewise flows through the pipe 14 into the solar heater unit 10. As the sun's rays, indicated by the arrows in Figure 7, beat down upon the solar heaters 10, the heat of the sun is transferred to the heat exchanger tubes, assisted by their fins, and this heat passes into the water in the tubes. The fins on the lower and upper headers also assist in collecting the heat, and an insulation layer (not shown) behind the heat exchanger 90 in the casing 21 (Figure 7) prevents loss of the heat into the roof 12. As the water becomes heated, it becomes lighter and hence flows through the pipe 15 into the upper portion of the tank 16. This sets up a circulation by convection currents, and this re-circulation causes the water to become hotter and hotter upon each passage through the solar heater 10. The heated water is drawn off through the pipe 19 for service to the household or other installation where the solar heater is used. In actual installations the operation of the circuit shown in Figure 7 is somewhat improved if the pipe 15 is inclined slightly upward from the solar heater 10 toward the tank 16, so as to facilitate the flow of the heated water from the solar heater 10 to the tank 16.

What I claim is:

1. A solar heater including a heat exchanger having therein a plurality of heat exchanger tubes arranged side by side and having laterally-projecting longitudinally-extending fins integral therewith, and fluid inlet and outlet conduits connected to the opposite ends of said tubes, certain of said tubes being arranged in a zigzag formation with arcuate connecting conduits joining their alternate ends and with the opposite ends of said fins of arcuate shape adjacent said arcuate connecting conduits.

2. A solar heater including a heat exchanger having therein a plurality of heat exchanger tubes arranged side by side and having laterally-projecting longitudinally-extending fins integral therewith, and fluid inlet and outlet conduits connected to the opposite ends of said tubes, certain of said tubes being arranged in a zigzag formation with arcuate connecting conduits joining their alternate ends and with the opposite ends of said fins of arcuate shape adjacent said arcuate connecting conduits substantially fitting the curvature of said arcuate connecting conduits.

3. A solar heater including a heat exchanger having therein a plurality of heat exchanger tubes arranged side by side and having laterally-projecting longitudinally-extending fins integral therewith, and fluid inlet and outlet conduits connected to the opposite ends of said tubes, certain of said tubes being arranged in a zigzag formation with arcuate connecting conduits joining their alternate ends and with the opposite ends of said fins of arcuate shape adjacent said arcuate connecting conduits substantially fitting the curvature of said arcuate connecting conduits, said heat exchanger tubes and said connecting conduits being integral with one another.

4. A solar heater including a heat exchanger having therein a plurality of heat exchanger tubes arranged side by side and having laterally-projecting longitudinally-extending fins integral therewith, and fluid inlet and outlet conduits connected to the opposite ends of said tubes, certain of said tubes being arranged in a zigzag formation with arcuate connecting conduits joining their alternate ends and with the opposite ends of said fins of arcuate shape adjacent said arcuate connecting conduits substantially fitting the curvature of said arcuate connecting conduits, said heat exchanger tubes and said connecting conduits being integral with one another and with said inlet and outlet conduits.

CLINTON L. STOCKSTILL.

REFERENCES CITED

The following references are of record in the file of this patent:

UNITED STATES PATENTS

| Number | Name | Date |
|---|---|---|
| 622,872 | Thornycroft | Apr. 11, 1899 |
| 966,070 | Bailey | Aug. 2, 1910 |
| 1,258,405 | Harrison | Mar. 5, 1918 |
| 1,682,404 | Murray et al. | Aug. 28, 1928 |
| 1,889,238 | Clark | Nov. 29, 1932 |
| 1,971,242 | Wheeler | Aug. 21, 1934 |
| 2,138,525 | Higham | Nov. 29, 1938 |
| 2,268,885 | McCullough | Jan. 6, 1942 |
| 2,274,492 | Modine | Feb. 24, 1942 |
| 2,277,311 | Freeman | Mar. 24, 1942 |
| 2,281,299 | Steenstrip | Apr. 28, 1942 |
| 2,311,579 | Scott | Feb. 16, 1943 |
| 2,347,957 | McCullough | May 2, 1944 |

FOREIGN PATENTS

| Number | Country | Date |
|---|---|---|
| 891,592 | France | Dec. 11, 1943 |